United States Patent
Seetharamakrishnan et al.

(10) Patent No.: US 12,483,404 B2
(45) Date of Patent: Nov. 25, 2025

(54) METHODS AND SYSTEMS FOR MODULATING ELECTRICITY GENERATION OR CONSUMPTION THROUGH MULTICAST COMMUNICATIONS OVER BROADCAST MEDIUMS

(71) Applicant: SPECTRUM CO, LLC, Arlington, VA (US)

(72) Inventors: Devasenapathi P. Seetharamakrishnan, Bangalore Karnataka (IN); Sasha Javid, Arlington, VA (US)

(73) Assignee: SPECTRUM CO, LLC, Arlington, VA (US)

( * ) Notice: Subject to any disclaimer, the term of this patent is extended or adjusted under 35 U.S.C. 154(b) by 398 days.

(21) Appl. No.: 18/021,079

(22) PCT Filed: Apr. 28, 2021

(86) PCT No.: PCT/IB2021/053554
§ 371 (c)(1),
(2) Date: Feb. 13, 2023

(87) PCT Pub. No.: WO2022/034384
PCT Pub. Date: Feb. 17, 2022

(65) Prior Publication Data
US 2023/0318827 A1 Oct. 5, 2023

Related U.S. Application Data

(60) Provisional application No. 63/065,744, filed on Aug. 14, 2020.

(51) Int. Cl.
*H04L 9/30* (2006.01)
*G06Q 50/06* (2024.01)
(Continued)

(52) U.S. Cl.
CPC .............. *H04L 9/30* (2013.01); *H02J 3/14* (2013.01); *H02J 13/00022* (2020.01); *G06Q 50/06* (2013.01); *H02J 2310/62* (2020.01)

(58) Field of Classification Search
CPC ............. H02J 2310/56; H02J 13/00026; H02J 13/00001; Y02B 90/20; Y04S 40/121
See application file for complete search history.

(56) References Cited

U.S. PATENT DOCUMENTS

2013/0257179 A1* 10/2013 Sakai .................... H02J 3/32
307/126
2013/0274936 A1 10/2013 Donahue et al.
(Continued)

FOREIGN PATENT DOCUMENTS

WO 2022034384 A1 2/2022

OTHER PUBLICATIONS

International Preliminary Report on Patentability dated Feb. 23, 2023, for PCT application No. PCT/IB2021/053554. 15 pages.
(Continued)

*Primary Examiner* — Mohammad Ali
*Assistant Examiner* — Dhruvkumar Patel
(74) *Attorney, Agent, or Firm* — Pillsbury Winthrop Shaw Pittman LLP

(57) ABSTRACT

Methods and systems describe multicasting the messages over a broadcast medium (e.g., a TV network). In particular, the methods and systems recite the use of Advanced Television Systems Committee ("ATSC") 3.0, a new broadcast television transmission standard in the United States. Using ATSC 3.0, the methods and systems can disseminate messages to all the electrical equipment.

18 Claims, 9 Drawing Sheets

(51) Int. Cl.
*H02J 3/14* (2006.01)
*H02J 13/00* (2006.01)

(56) References Cited

U.S. PATENT DOCUMENTS

| | | |
|---|---|---|
| 2014/0018969 A1 | 1/2014 | Forbes, Jr. |
| 2014/0108789 A1* | 4/2014 | Phatak ................ H04L 63/0823 |
| | | 713/168 |
| 2014/0277788 A1* | 9/2014 | Forbes, Jr. .............. H04L 67/10 |
| | | 700/286 |
| 2016/0033986 A1* | 2/2016 | Kamel ...................... G05F 1/66 |
| | | 700/295 |
| 2016/0323736 A1* | 11/2016 | Donahue ............... H04L 63/061 |
| 2017/0069008 A1* | 3/2017 | Wang ........................ H02J 3/14 |
| 2019/0124413 A1 | 4/2019 | Ng et al. |

OTHER PUBLICATIONS

International Search Report and Written Opinion mailed Aug. 16, 2021, International application No. PCT/IB2021/053554.

* cited by examiner

400

| Zero Count | Transmitter | | Receiver | | | |
|---|---|---|---|---|---|---|
| | Nonces Tried | Valid Hashes Found | Nonces Tried | Valid Hashes Found | Invalid Hashes Found | Decryption Attempts |
| 1 | $10^3$ | 57 | 683 | 40 | 643 | 40 |
| 2 | $10^3$ | 5 | 184 | 1 | 183 | 1 |
| 3 | $10^3$ | 1 | 385 | 1 | 384 | 1 |
| 4 | $10^5$ | 1 | 22,853 | 1 | 22,852 | 1 |
| 5 | $10^6$ | 6 | 6,883,086 | 5 | 6,883,081 | 5 |
| 6 | $10^8$ | 8 | 10,322,716 | 1 | 10,322,715 | 1 |
| 7 | $10^8$ | 1 | 50,320,701 | 1 | 50,320,700 | 1 |

[zipcode=02139]
[consumer_type='residential']
[equipment='PV' [capacity>=10000]]
[start_time='2020-07-15 15:00:00']
[end_time='2020-07-15 16:00:00']
[action = ' curtail' [maximum 5000][minimum=0]]

FIG. 5 ial equipment types; (iii) the lack of a standardized method for coordinating the electrical equipment (iv) security and privacy requirements; and (v) the challenges of ensuring fairness among consumers.

METHODS AND SYSTEMS FOR MODULATING ELECTRICITY GENERATION OR CONSUMPTION THROUGH MULTICAST COMMUNICATIONS OVER BROADCAST MEDIUMS

CROSS-REFERENCE TO RELATED APPLICATIONS

This application is a U.S. national stage application filed under 35 U.S.C. § 371 that claims priority to PCT application No. PCT/IB2021/053554, filed Apr. 28, 2021, which claims priority to U.S. Provisional Patent Application No. 63/065,744, filed Aug. 14, 2020, the contents of each are hereby incorporated by reference in their entirety.

FIELD OF THE INVENTION

This invention relates to modulating electricity generation and/or consumption through multicast communications over broadcast mediums.

BACKGROUND

Power grids across the world are going through a fundamental paradigm shift with the increased penetration of Demand Response (DR) programs through responsive loads and Distributed Energy Resources (DER) such as rooftop solar generation units and behind-the-meter energy storage systems. To ensure the supply of and demand for electricity are balanced in such decentralized grids, utility companies frequently need to send messages to modulate the generation and/or consumption levels of such electrical equipment. For instance, all heating, ventilation, and air conditioning (HVAC) loads could be instructed to reduce their consumption by a certain percentage during peak load hours of power grids or a subset of rooftop solar generation units could be asked to curtail their generation during the low-demand periods.

SUMMARY

Unlike centralized power grids, the decentralized power grids require a reliable communication infrastructure that can efficiently disseminate control and coordination messages to time-varying subsets of electricity consumers and equipment.

To ensure the stability of grids in decentralized electricity systems, the methods and systems described herein recite periodically sending (e.g., initiated by distribution network operators) messages to the decentralized electrical equipment (e.g., distributed generation systems and/or devices comprising responsive loads) to modulate their generation and/or consumption levels (e.g., to curtail solar generation, manage charging and discharging patterns of batteries, and execute DR events). The transmission of these messages is complicated however by (i) the number of different electrical devices to which the periodic messages must be sent; (ii) the variety of electrical equipment types; (iii) the lack of a standardized method for coordinating the electrical equipment (iv) security and privacy requirements; and (v) the challenges of ensuring fairness among consumers.

In order to reduce processing requirements and increase efficiency due to the number of different electrical devices to which the periodic messages must be sent, the methods and systems multicast the same message to the different electrical devices. For example, the methods and systems may send a message to all heating, ventilation, and air conditioning ("HVAC") loads that have consumed more than 5 kWh of energy in the last 30 minutes instructing those devices to reduce their consumption by a certain percentage during peak hours of the grid. Communicating to subsets of electrical equipment can be implemented over multicasting—a group communication mechanism where data is simultaneously sent to a group of destination nodes. Such group communication systems require multicast routing. However, as an additional technical hurdle, many networks, including the Internet, do not support multicast routing. In fact, conventional application layer multicast systems use multiple unicast transmissions to simulate a multicast. As a result, disseminating these multicast messages to electrical equipment over conventional TCP/IP networks such as the Internet is inefficient.

To overcome this additional technical hurdle, the methods and systems describe multicasting the messages over a broadcast medium (e.g., a TV network). In particular, the methods and systems describe the use of Advanced Television Systems Committee ("ATSC") 3.0, a new broadcast television transmission standard in the United States. Using ATSC 3.0, the methods and systems can disseminate messages to all the electrical equipment. However, even after determining to transmit messages to modulate electricity generation and/or consumption through multicast communications over broadcast mediums (e.g., using ATSC 3.0), the methods and systems described herein face an additional technical challenge due to the variety of electrical equipment types, and security and privacy concerns. These challenges may raise additional technical issues.

First, over-the-air broadcasts to numerous electrical devices are not confidential, and thus may require authentication of a sender of the message as well as security protocols to prevent unauthorized use (e.g., to avoid replay attacks or other network attacks). Accordingly, the methods and systems described herein provide a novel and unconventional approach to authorization that may be implanted, even for electrical devices that do not have two-way communication abilities, in a way that protects the system from a variety of network attacks. Second, dissemination of instructions to numerous electrical devices requires a mechanism for addressing subsets of devices without knowing their unique identifiers while maintaining the security and privacy requirements. Accordingly, the methods and systems described herein provide a novel and unconventional approach to multicast addressing using a particular data format (e.g., using state-based addressing) and count-specification mechanisms to select specific subsets of electrical equipment despite the varied number, types, and lack of standardization between the plethora of electrical devices in a network (e.g., solar panels, fossil-fuel based generators, microwaves, electric car charging stations, refrigerators, washing-machines, home video equipment, server farms, traffic lights, etc.) In one aspect, systems and methods are described for modulating electricity generation and/or consumption through multicast communications over broadcast mediums. For example, the system may receive, at a network device, over a communication network comprising an ATSC 3.0 standard, a multicast communication comprising a message (e.g., a demand response message), wherein the message comprises instructions for modulating electricity generation and/or consumption. The system may verify, at the network device, that the message is from an authorized source. The system may, in response to verifying that the message is from the authorized source, parsing, at the network device, the message for an instruction related to modulating electricity generation and/or consumption. For example, the system may, after verifying that the message is from an authorized source, parse the message to extract the details of the modulation event. The system may determine, at the network device, an electrical device of a plurality of electrical devices to which to transmit the instruction. The system may transmit, by the network device, the instruction to the electrical device, wherein the instruction causes the electrical device to modulate its electricity generation and/or consumption.

Various other aspects, features and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 4 shows a table of results of the successful decryption results for messages encrypted as described in FIG. 3.

FIG. 5 shows an illustrative data format for multicast addressing of messages, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known models and devices are shown in block diagram form in order to avoid unnecessarily obscuring the embodiments of the invention.

Figure 1:
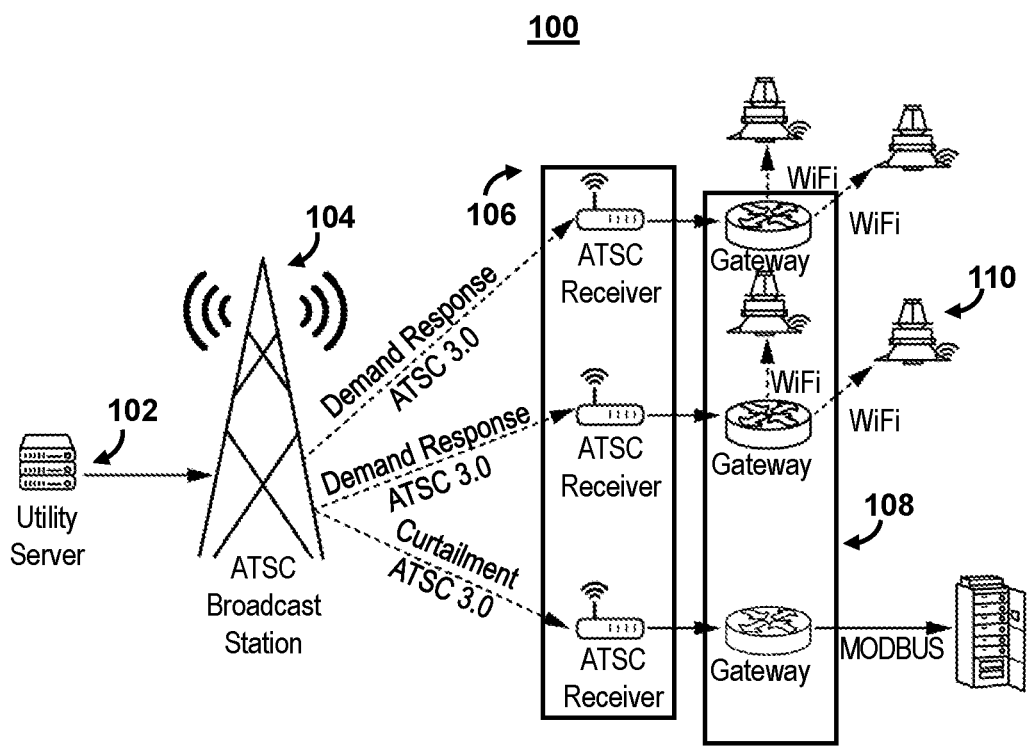
FIG. 1 shows an illustrative network diagram for modulating electricity generation and/or consumption through multicast communications over broadcast mediums using a gateway device, in accordance with one or more embodiments.

FIG. 1 shows an illustrative network diagram for modulating electricity generation and/or consumption through multicast communications over broadcast mediums using a gateway device, in accordance with one or more embodiments. For example, FIG. 1 shows system 100, which is broadcasting messages. As referred to herein, broadcasting may include any transferring of message to substantially all recipients substantially simultaneously. For example, system 100 may broadcast messages (e.g., DER messages and/or demand response messages) to a plurality of electrical devices substantially simultaneously.

System 100 may transmit messages, which may comprise any communication (despite format, medium, or strength) that communicates information. The messages may be demand response messages and/or the messages may be any messages related to distributed energy resources ("DER") applications. For example, DER message may focus on generation (e.g., via solar inverters, wind turbines, etc.) of energy or energy storage (e.g., charging or discharging of batteries through storage inverters). Messages may relate to demand management applications and may focus on decreasing or increasing energy consumption. It should be noted that any embodiment disclosed herein may relate to DER applications and/or demand management applications. Furthermore, any embodiment disclosed herein may relate to messages for DER applications and/or demand management applications. For example, FIG. 2 below describes the use of messages and a demand response manager (e.g., manager 210 (FIG. 2)). In some embodiments, FIG. 2, and its related embodiments, may relate to the use of DER messages and a DER manager (e.g., manager 210 (FIG. 2) may comprise a DER manager).

The message may also be a multicast communication (e.g., a communication that has been sent to a subset or all of electrical equipment). As referred to herein, a message may include any message related to a change in power generation and/or consumption. For example, a message may comprise instructions for an electrical device regarding a change, and/or curtailment, in power generation and/or consumption to better match a demand for power with a supply. In some embodiments, the demand response may be an event-based demand response where a utility company (e.g., utility server 102) requests a shedding of load or powering a load etc. Alternatively or additionally, the demand response may include incentive-based messaging for controlling generation and/or consumption (e.g., pricing incentives based on time, demand, and/or supply). As referred to herein an "electrical device" may comprise any device that uses, generates, and/or consumes electricity. For example, an electrical device may include distributed generation systems and/or devices comprising responsive loads. In some embodiments, system 100 may comprise a component of a smart grid in which system 100, and its demand messages, may improve the ability of electricity producers and consumers to communicate with one another, synchronize, and coordinate to modulate electricity generation and/or consumption.

System 100 includes utility server 102. Utility server 102 comprise a server and/or other computer system used by a utility and/or other company to monitor and/or modulate electricity generation and/or consumption. Utility server 102 may manage the balancing and/or coordination of electrical devices in an electrical grid (and/or a region of an electrical grid). Utility server 102 may facilitate the synchronization and/or coordination of electrical devices through messaging mechanisms that orchestrate distributed energy resources ("DER") and responsive loads. For example, in some embodiments, system 100 may comprise a grid featuring electrical generation and storage performed by a variety of small, grid-connected or distribution system-connected devices. In some embodiments, system 100 may feature renewable energy sources, including small hydro, biomass, biogas, solar power, wind power, and/or geothermal power. Additionally or alternatively, system 100 may feature conventional power stations, such as coal-fired, gas, and nuclear powered plants, as well as hydroelectric dams and large-scale solar power stations, are centralized and often require electric energy to be transmitted over long distances. Additionally or alternatively, system 100 may feature a microgrid architecture that may disconnect from a centralized grid and operate autonomously, strengthen grid resilience, and/or help mitigate grid disturbances.

System 100 may also include broadcast station 104. In some embodiments, broadcast station 104 may comprise, or be a component of, a broadcast network, which may include a group of radio stations, television stations, or other electronic media outlets that air or broadcast content from a centralized source. In some embodiments, system 100 may comprise satellite-based media, streaming media, Internet radio, and/or webcast broadcasters. Broadcast station 104 may use a standard or a set of standards (e.g., DVB, ATSC, ISDB, etc.) for transmission over terrestrial, cable and satellite networks. In some embodiments, broadcast station 104 may use ATSC 3.0. Broadcast station may distribute messages as IP packets (e.g., over ATSC 3.0).

ATSC 3.0 is an IP-based standard that uses orthogonal frequency-division multiplexing ("OFDM") modulation. Television stations that transition to the ATSC 3.0 standard have flexibility to partition their 6 MHz channels into physical layer pipes ("PLPs"). Thus, a broadcaster may use one PLP to provide enhanced video services, and a second PLP for broadcast data services. In addition, each PLP can be assigned to a specific reception robustness requirement. For example, a mobile data service requires more robust (e.g., lower carrier-to-noise ratio) delivery than a fixed video service. This flexibility may be used by system 100 to package messages for modulating electricity generation and/or consumption. The ATSC 3.0 standard is defined in a suite of more than 20 Standards and companion Recommended Practices. It should be noted that in some embodiments the system may utilize upgraded, updated, and/or functionally equivalent versions of ATSC 3.0 and/or standards with one or more of the standards in the suite (e.g., DVB-T2).

Notably, the cost savings for users of ATSC 3.0 broadcasts for their connectivity is substantial versus even the most aggressive cellular pricing plans for IoT applications. As an example, current plans from Verizon or AT&T charge between $1.00 and $1.50 per month per endpoint (IoT node). With 200,000 participants in a demand response program, at $1.00 per endpoint, connectivity costs for a utility company may reach $2.4 million per year, even if only a handful of transmissions were required. Although pricing for ATSC 3.0 data transmissions have not been finalized by broadcasters, a flat rate per transmission, or a charge based on a cost per thousand devices (e.g., similar to online advertising) has been contemplated. This is economically feasible because of the efficiency of a broadcast architecture, which allows millions of customers to be reached with a single broadcast. At a cost of $100 per every 1000 receivers reached, the cost for the utility company per event would be $20,000. Assuming 25 demand response-related transmissions over the ATSC 3.0 network during the course of the year, the cost for the utility company would be only $500,000, or almost a five-time savings over cellular. These cost savings grow exponentially as millions of receivers join the network.

Broadcast station 104 may transmit (e.g., via ATSC 3.0) a message, provided by utility server 102, to one or more receivers (e.g., receivers 106). For transport, ATSC 3.0 may use an Internet Protocol ("IP")-based systems specification based on the DASH Route or MMT specifications, to encapsulate data, subject to certain constraints. ATSC 3.0 may use the IP-based transport stream packets to carry data to receivers 106. Before decoding of audio and video takes place, receivers 106 may demodulate and apply error correction to the signal. Then, the transport stream may be demultiplexed into its constituent streams. Receivers 106 may then transmit the received messages to gateway devices 108.

The system (e.g., using ATSC 3.0) may operate up to 1024 and 4096 QAM (a digital standard using quadrature amplitude modulation), compared with DVB-T2 where the highest option is 256 QAM. The higher modulation scheme of the system allows for more bits per symbol. For example, the transport layer of the system (e.g., using ATSC 3.0) moves away from MPEG2 Transport Stream (TS), which is an industry convention. Instead it relies on an IP system based on the DASH Route and MMT specifications. The system (e.g., using ATSC 3.0) may rely on the MPEG Common Encryption (MPEG-CENC) scheme. The transmission of the message (e.g., by broadcast station 104) may comprise a multicast. As referred to herein, a multicast may be a group communication where data transmission is addressed to a group of destinations simultaneously. In some embodiments, the system may use an IP multicast, which may involve sending IP datagrams to a group of interested receivers in a single transmission.

Gateway devices 108 may perform several functions in response to receiving a message (e.g., a demand response message and/or DER message). For example, gateway devices 108 may verify the messages are from one or more authorized sources by decrypting the message using a public key of one of the authorized utility servers (e.g., as described below in relation to FIG. 4). For example, in some embodiments, gateway devices 108 may verify that a received message is from an authorized source by decrypting the message using a public key of the authorized source (e.g., as further described below in FIG. 3).

Gateway devices 108 may parse the message (e.g., a demand response message and/or DER message) for an instruction related to modulating electricity generation and/or consumption of electrical devices. In some embodiments, based on the instructions (e.g., as further described in FIG. 5 below), the gateway device may compute an appropriate number of electrical devices to achieve a level of adjustment specified in the message. For instance, if the total load that must be reduced is stated (e.g., in kWh), gateway devices 108 may find an optimal list of loads whose cumulative load corresponds to that amount. For example, gateway devices 108 may parse the message for a data format (e.g., the data format shown and described in FIG. 5 below).

Gateway devices 108 may determine an appropriate electrical device based on the instruction. For example, gateway devices 108 select a group of devices (e.g., a group of devices in a household, region, device type, device class, power consumption level, etc.) based on the cumulative load. Additionally or alternatively, gateway devices 108 may interpret the instructions in the message (which may be a particular data format (e.g., data format 500 (FIG. 5)). In some embodiments, gateway devices 108 may not perform a determining step, and instead pass the message to all connect devices. The connected device may then interpret the message and/or instructions.

Gateway devices 108 may transmit the message (and/or instructions based on the message) to appropriate connected electrical equipment. In some embodiments, gateway devices 108 may first translate the message to an embedded protocol and forward the message to appropriate connected electrical equipment. Gateway devices 108 may translate the messages to any embedded protocols such as MODBUS, OPC, Profibus, etc. The protocol may use character serial communication lines, Ethernet, or the Internet protocol suite as a transport layer. Gateway devices 108 may then distribute the messages to electrical devices, such as electrical device 110. Electrical devices 110 may be any devices that generate and/or consume electricity. For example, in FIG. 1, electrical devices 110 may be any device that consumes electricity (e.g., lights, water heaters, air conditioners, etc.), and/or any device that provides for electrical generation and/or storage such as solar inverters, wind turbines, etc.

It should be noted that, as further illustrated below in relation to manager 210 (FIG. 2), the steps described above in relation to gateway devices 108 may be performed by other network devices and/or other network devices may be considered as gateway devices in some embodiments. For example, in some embodiments, a gateway device may comprise a network device (or software component) that facilitates a communication. In some embodiments, a gateway device may comprise a hardware device that acts as a "gate" between two networks. For example, it may be a router, firewall, server, or other device that enables traffic to flow in and out of the network. Alternatively or additionally, the gateway device may be a device that protects the nodes within a network, and/or a node itself. In some embodiments, the functions of gateway devices 108 may be performed by one or more electrical devices (e.g., electrical device 110).

Notably, two-way communication between the users (e.g., electrical device 110) and utilities (e.g., utility server 102) are not required before acting on messages. Additionally, there may, in some embodiments, be an indirect communication channel from users (e.g., electrical device 110) to utilities (e.g., utility server 102) for validating the responses. For example, smart meters may serve as this implicit upstream channel. For example, utilities may deploy smart meters for collecting time-variant consumption and generation patterns. A smart meter may be an electronic device that records information such as consumption of electric energy, voltage levels, current, and power factor. Smart meters may communicate the information to users for greater clarity of consumption behavior, and electricity suppliers for system monitoring and customer billing. Smart meters may record energy near real-time, and report regularly, short intervals throughout the day.

Smart meters may also enable two-way communication between the meter and the central system. Wireless communication options may include cellular communications, Wi-Fi, wireless ad hoc networks over Wi-Fi, wireless mesh networks, low power long-range wireless (LoRa), ZigBee (low power, low data rate wireless), and Wi-SUN (Smart Utility Networks). In some embodiments, the meter may use TCP/IP technology as a common communication platform for applications, such that utilities may deploy multiple communication systems, while using IP technology as a common management platform. System 100 may use a transport layer protocol to use multicast addressing (e.g., User Datagram Protocol (UDP)). System 100 may further ensure reliability by adding loss detection and retransmission mechanisms.

Figure 2:
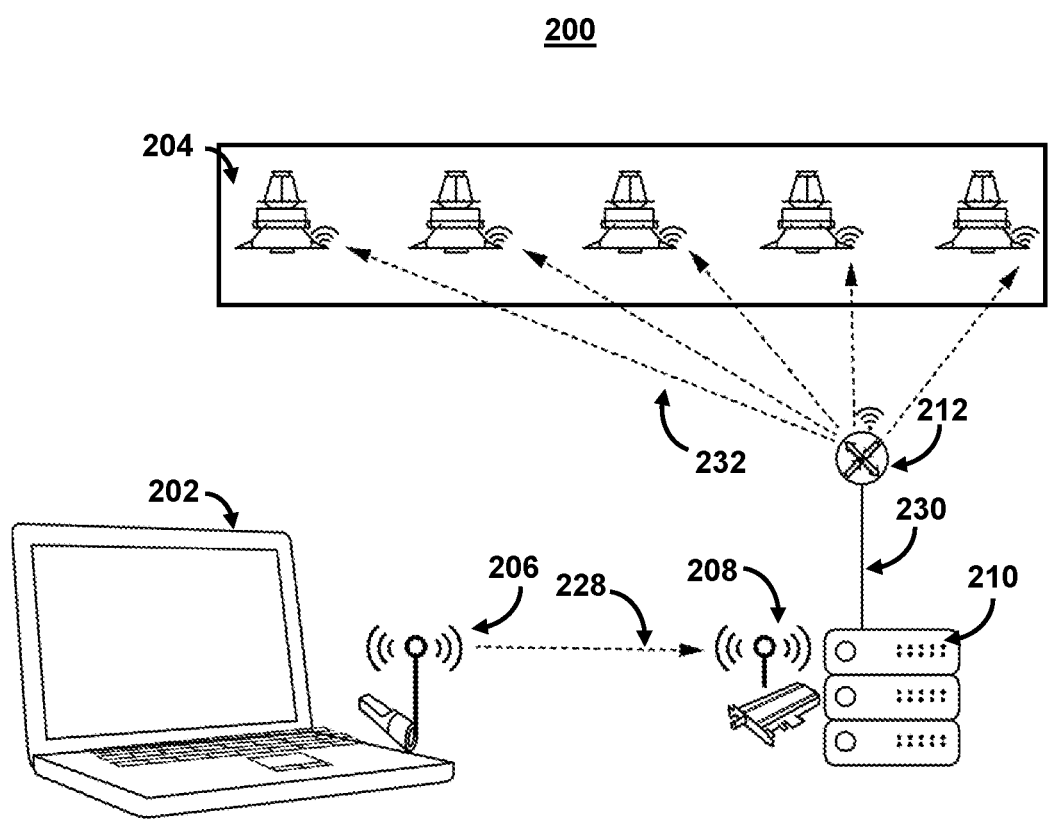
FIG. 2 shows another illustrative network diagram for modulating electricity generation and/or consumption through multicast communications over broadcast mediums using a demand response manager, in accordance with one or more embodiments.

FIG. 2 shows another illustrative network diagram for modulating electricity generation and/or consumption through multicast communications over broadcast mediums using a demand response manager, in accordance with one or more embodiments. It should be noted that FIG. 2 and system 200 may comprise a generic example a system and/or environment as is not limiting. For example, system may show the modulating electricity generation and/or consumption through multicast communications over broadcast mediums for a plurality of devices (e.g., devices 204) using a demand response manager (e.g., manager 210). For example, devices 204 may comprise a group of WiFi enabled Smart LED lights. System 200 may use message data structures (as discussed in FIGS. 3 and 5 below).

Device 202 (e.g., currently running a web application) may issue a message (e.g., using a message generator application) that results in devices 204 adjusting their brightness. Device 202 may include any type of mobile terminal, fixed terminal, or other device. Device 202 may receive user inputs and data via input/output (hereinafter "I/O") paths and may also include processors and/or control circuitry to send and receive commands, requests, and other suitable data using one or more I/O paths. The control circuitry may be comprised of any suitable processing circuitry. Each of these devices may also include a user input interface and/or display for use in receiving and displaying data. By way of example, device 202 may include a desktop computer, a server, or other client device. Users may, for instance, utilize one or more of the user devices to interact with one another, one or more servers, or other components of system 200. As referred to herein, a message generator application may comprise any application that manages and/or performs functions related to modulating electricity generation and/or consumption, including generating messages (e.g., a demand response message and/or DER message). In some embodiments, a message generator application may initiate multicast communications over broadcast mediums related to messages.

It should be noted that, while one or more operations are described herein as being performed by particular components of system 200, those operations may, in some embodiments, be performed by other components of system 200. As an example, while one or more operations are described herein as being performed by components of manager 210, those operations may, in some embodiments, be performed by components of user device 202. As another example, some embodiments, may not require modulator 206 and/or receiver 208, and their respective functionality may be incorporated into another component of system 200. System 200 may also include machine learning models (as described below), which may be implemented on device 202, manager 210, or accessible by communication paths 228 and 230, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments). It should be noted that in some embodiments, the machine learning model, similar to other embodiments described herein, does not require a back-channel communication for updating itself and/or generating recommendations for updates (e.g., regarding the modulation of electricity generation and/or consumption).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein. One or more of the components of system 200 may include cloud-based components (e.g., cloud-based memory, cloud-based control circuitry, cloud-based I/O circuitry, etc.).

FIG. 2 also includes communication paths 228, 230, and 232. Communication paths 228, 230, and 232 may include the Internet, a mobile phone network, a mobile voice or data network (e.g., a 5G or LTE network), a cable network, a public switched telephone network, or other types of communications network, or combinations of communications networks. Communication paths 228, 230, and 232 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths, including ATSC 3.0 broadcasts. The computing devices may include additional communication paths linking a plurality of hardware, software, and/or firmware components operating together. For example, the computing devices may be implemented by a cloud of computing platforms operating together as the computing devices. In some embodiments, system 200 may comprise more or less communication paths (e.g., may not comprise back-channel communication paths).

Device 202 may be connected to modulator 206. Modulator 206 may be a powered modulator that supports cable, satellite, terrestrial modulation in a single portable device (e.g., a DTU-315). Modulator 206 may transmit the message (e.g., a demand response message and/or DER message) to receiver 208, which may be incorporated into and/or accessible by manager 210 (e.g., a server, local workstation, etc.). For example, receiver 208 may be a multi-standard cable/terrestrial receiver (e.g., a VHF/UHF receiver with support for cable and terrestrial standards, including ATSC 3.0, DAB, DVB-T2 and ISDB-T) such as a DTA-2131.

Manager 210 may be a device that monitors the electrical generation and/or consumption of itself, another device, and/or a group of devices. For example, manager 210 may orchestrate the protection and/or adjustment of local demand settings. For example, appliances such as electric cars, pool pumps, and water feature/fountains may all be scheduled into off peak times when electricity may be purchased for a discounted rate, in times of peak demand/low supply, and/or in accordance with a demand management plan/policy. For example, manager 210 may advance or delay appliance operating cycles (e.g., via an instruction delivered by router 212) by a few seconds to increase the diversity factor of the set of loads. For example, by monitoring the power factor of local generation and/or consumption, as well as local control parameters, individual and/or intermittent loads may be switched on or off at optimal moments to balance the overall system load. As this switching may only advance or delay the appliance operating cycle by a few seconds, such switches may be unnoticeable to an end user.

Similar to gateway devices 108 (FIG. 1), manager 210 may perform several functions in response to receiving a message. For example, manager 210 may verify the messages are from authorized sources by decrypting the message using a public key of one of the authorized utility servers (e.g., as described below in relation to FIG. 4). Manager 210 may parse the messages and compute an appropriate number of appliances to achieve the level of adjustment specified in those messages. For instance, if the total load that must be reduced is stated (e.g., in kWh), manager 210 may find an optimal list of loads whose cumulative load corresponds to that amount. For example, manager 210 may parse the message for a data format (e.g., the data format shown and described in FIG. 5 below). For example, manager 210 selects a group of devices (e.g., devices 204), and may adjust electrical use of devices 204 (e.g., adjust brightness of devices 204) based on the cumulative load. Manager 210 may then translate the messages to an embedded protocol and forward those messages to appropriate connected electrical equipment. Manager 210 may then translate the messages to any embedded protocol.

In some embodiments, manager 210 may use one or more machine learning models to perform functions in response to receiving a message. As an example, with respect to FIG. 2, a machine learning model may take inputs (e.g., current electrical generation and/or consumption information) and provide outputs (e.g., modulation of the current electrical generation and/or consumption information of one or more devices). The inputs may include multiple data sets, such as a training data set and a test data set. Each of the plurality of data sets may include data subsets with common characteristics (e.g., likely current, future, and/or historical generation and/or consumption during a current and/or upcoming time period). In some embodiments, outputs may be fed back to a machine learning model as input to train the machine learning model (e.g., alone or in conjunction with user indications of the accuracy of outputs, labels associated with the inputs, or with other reference feedback information). In another embodiment, machine learning model may update its configurations (e.g., weights, biases, or other parameters) based on the assessment of its prediction (e.g., outputs) and reference feedback information (e.g., user indication of accuracy, reference labels, or other information). In another embodiment, where machine learning model is a neural network, connection weights may be adjusted to reconcile differences between the neural network's prediction (e.g., a predicted electrical generation and/or consumption amount) and the reference feedback (e.g., an actual electrical generation and/or consumption amount). In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model may be trained to generate better predictions. For example, in some embodiments, the machine learning model may be trained to predict electrical generation and/or consumption amount to be used by a group of devices, that may be save by a modulation of the electrical generation and/or consumption amount of a group of devices, etc.

In some embodiments, a machine learning model may include an artificial neural network. In such embodiments, a machine learning model may include input layer and one or more hidden layers. Each neural unit of the machine learning model may be connected with many other neural units of a machine learning model. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. A machine learning model may be self-learning and trained, rather than explicitly programmed, and can perform significantly better in certain areas of problem solving, compared to traditional computer programs. During training, an output layer of the machine learning model may correspond to a classification of the machine learning model, and an input known to correspond to that classification may be input into an input layer of the machine learning model during training. During testing, an input without a known classification may be input into the input layer, and a determined classification may be output.

In some embodiments, the machine learning model may include multiple layers (e.g., where a signal path traverses from front layers to back layers). In some embodiments, back propagation techniques may be utilized by a machine learning model where forward stimulation is used to reset weights on the "front" neural units. In some embodiments, stimulation and inhibition for the machine learning model may be more free flowing, with connections interacting in a more chaotic and complex fashion. During testing, an output layer of the machine learning model may indicate whether or not a given input corresponds to a classification of a machine learning model (e.g., a prediction related to a modulation of electrical generation and/or consumption).

Figure 3:
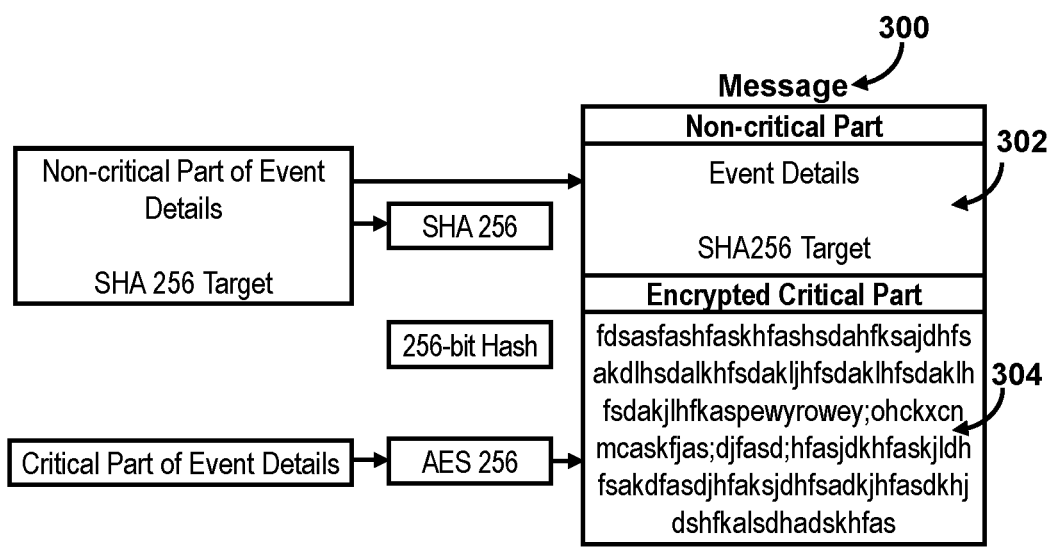
FIG. 3 shows an illustrative message for modulating electricity generation and/or consumption through multicast communications over broadcast mediums featuring encryption means, in accordance with one or more embodiments.

FIG. 3 shows an illustrative message for modulating electricity generation and/or consumption through multicast communications over broadcast mediums featuring encryption means, in accordance with one or more embodiments. For example, as the methods and systems rely on modulating electricity generation and/or consumption through multicast communications over broadcast mediums, the messages, which may be broadcast to a large number of devices, are not confidential, and may be at risk of unauthorized access. For example, the system may need to authenticate a sender of a message to avoid network attacks such as replay attacks (e.g., where a valid data transmission is maliciously or fraudulently repeated or delayed). FIG. 3 shows demand message 300, which may comprise metadata and/or information related to a demand response event corresponding to message 300.

In some embodiments, message 300 may be accessed using a private and/or public key. For example, a private key may be used to both encrypt and decrypt the data, and may be shared between the sender and receiver of encrypted data. The private key is also called symmetric, being common for both parties. Private key cryptography is faster than a public-key cryptography mechanism. The public key may be used to encrypt, and a private key used decrypt the data. The private key may be shared between the sender and receiver of the encrypted sensitive information. The public key is also called asymmetric cryptography. In some embodiments, message 300 may be encrypted using a private key and decrypted using a public key.

As shown in FIG. 3, the system may encrypt a message. For example, a message from a utility company (e.g., utility server 102 (FIG. 1)) that is distributed may be encrypted using that utility server's RSA private key. Encrypting the entire message not only ensures integrity of the message, but can also help the receiver (e.g., receiver 106 (FIG. 1)) to authenticate the source (e.g., by decrypting the message using the public key of the sender). In some embodiments, prior to verification, the public keys of authorized servers (e.g., utility server 102 (FIG. 1)) may be downloaded on to the receivers (e.g., receivers 106 (FIG. 2)) using an out-of-band channel or other communication method. The use of the public encryption key may ensure that messages are tamper proof.

To prevent replay attacks, the message may include two timestamps (e.g., as shown in data format 500 (FIG. 5) below). For example, the system may include information about a message start time (e.g., a "message-validity-start-time" parameter) and information about a message end time (e.g., a "message-validity-end-time" parameter). The message may also include a limit on a number of responses (e.g., a "max-response-count" parameter). Based on these timestamps, the system may process message only within the time window bound by the aforementioned timestamps. The system may also limit the number of responses based on a value of the "max-response-count" parameter. Using these parameters, the system may inhibit any unexpected actions taken by a receiving party, even if there is a replay attack. In some embodiments, to further secure the system and/or message, the system may ensure that the clocks of receivers are synchronized with those of the transmitters (e.g., with a synchronization accuracy in the order of seconds).

Additionally or alternatively, the system may use a mechanism that deters denial-of-service attacks and other service abuses on the network by requiring some work from the service requester (e.g., processing time by a computer) as a proof-of-work mechanism. For example, the system may ensure receivers complete certain computational tasks before processing a message.

As shown in FIG. 3, message 300 may be divided into two sections: a noncritical section (e.g., section 302) and a critical section (e.g., section 304). The section may likewise each include a part of the event details (e.g., a critical part of the event details and a non-critical part of the event details). Critical section 304 may be encrypted and contains essential details. In some embodiments, essential details may include a relevant time period (e.g., hours of a demand response event), a list of devices subject to the message (e.g., a list of charging stations that offer discounted prices), and/or event details (e.g., a price, cost, and/or modulation amount for generation and/or consumption during the demand response event). Non-critical section 302 may provide details of the tasks mandated by the system (e.g., mandated tasks to be completed before processing the message).

Non-critical section 302 may include event details such as a name a utility company, a message timestamp, and number of leading zeros that the 256-bit (SHA-256) hash value of the non-critical section must have. For example, the sender may generate a 256-bit hash of the non-critical section with the constraint that the hash value must begin with a specified number of zeros. Such a hash value may be generated by padding an appropriate nonce to noncritical section 302 of message 300 before generating the hash value. In some embodiments, the 256-bit hash value may be used as a key for a AES256 algorithm to encrypt critical section 304.

Message 300 (e.g., a demand response message and/or DER message), which contains both sections (e.g., encrypted critical section 304 and the plain-text non-critical section 302), may then be encrypted using a private key of the sender and transmitted (e.g., via ATSC 3.0). The receiver (e.g., receiver 208 (FIG. 2)), upon receiving message 300, may decrypt message 300 using a public key (e.g., downloaded the receiver using an out-of-band channel) of the sender to authenticate the message. If authenticated, the receiver may attempt to determine the nonce that is required for generating a SHA-256 hash that must begin with the specified number of zeros. In some embodiments, the nonce may be determined only through a brute-force search because SHA-256 is a one-way function. Additionally or alternatively, the system may select a search difficulty. For example, the search difficulty may be inversely proportional to the SHA-256 target specified in the message. By forcing the receiver to use the brute-force search, the system deters denial-of-service attacks and other service abuses on the network by requiring some work from the service requester (e.g., processing time by a computer). Notably, there can be multiple nonce values that lead to hash digests that begin with the specified number of zeros. However, only one of those digests may have been used by the sender to encrypt the message. Every valid hash digest that is below the target value may be used by an AES decryption engine to extract the encrypted text. Therefore, the process of finding a nonce and a hash digest may be repeated until a digest that successfully decrypts the critical section is found.

It should be noted that as opposed to the use of encryption to improve security of the system, the system may use encryption in a novel way to limit the number of devices that take an action in response to a message. For example, the encryption, as a Proof-of-Work function (e.g., hashcash), may work in concert with, or in addition to, the naming schema and random number generation mechanisms discussed herein. For example, if the naming schema and/or random number generation results in an error (or is otherwise unsuccessful or unavailable), the Proof-of-Work function may serve to limit the number of devices that respond to a message by allowing only those devices that complete certain computational tasks (e.g., finding a valid hash and successfully decrypting the message) within a specified timeframe to act on the message.

As used herein, a "hash" (or "hash value") is an output of a hash function, which is used to map data of arbitrary size to a finite value. This is a one-way operation, meaning that there is no way to invert the hash value and retrieve the original data. As such, the hashing operation is effective in cryptographic operations, such as described herein. For example, hashcash is a cryptographic hash-based proof-of-work algorithm that requires a selectable amount of work to compute; however, the proof of the work may be verified efficiently. For message (e.g., a demand response message and/or DER message) uses, a textual encoding of a hashcash stamp may be added/required for the message to prove that the sender and/or receiver (e.g., receiver 208 (FIG. 2)) has expended a modest amount of CPU time calculating the stamp prior to responding to, sending and/or executing on the message. The receiver and/or sender (e.g., a device receiving a response from a receiver (e.g., receiver 208 (FIG. 2)) depending on the embodiment) may, at negligible computational cost, verify that the stamp is valid.

As used herein, "hashcash" describes a "proof-of-work" algorithm that requires a "modest" amount of computational processing to perform. The purpose of such a hashcash algorithm is to verify that a data packet (e.g., a message, as disclosed herein) is valid and not generated via spamming. This related to the disclosed "nonce limit," which describes a number of zeros required to be present in a hash and thereby controls the amount of work to be done in finding a valid hash.

In some embodiments, the header may contain information such as a Hashcash format version, 1 (which supersedes version 0); a number of "partial pre-image" (zero) bits in the hashed code; the time that the message was sent, in the format YYMMDD[hhmm[ss]]; the resource data string being transmitted, e.g., an IP address or email address; a string of random characters (e.g., encoded in base-64 format); and/or a binary counter (e.g., encoded in base-64 format). The header may contain an identifier for the sender and/or recipient's (e.g., a network address, email address, serial number, etc.), the date of the message, and/or information proving that the required computation has been performed. The sender and/or receiver (e.g., depending on the embodiment) may prepare a header and append a counter value initialized to a random number. For example, it may the compute a hash (e.g., a 160-bit SHA-1 hash) for use in the header. If the first 20 bits (i.e. the 5 most significant hex digits) of the hash are all zeros, then the system may determine that this is an acceptable header. If not, then the system may increment the counter and try the hash again. For example, a receiver (e.g., receiver 208 (FIG. 2)) may calculates the hash (e.g., the 160-bit SHA-1 hash of the string, which may take on the order of one to two microseconds on a 1 GHz machine. If the first 20 bits are not all zero, the hash is invalid. The receiver may also check a time/date of the message. For example, if it is not within a threshold amount of time of a current time/date, it is invalid. The receiver may also verify an identifier in the message (e.g., the network address, e-mail address, and/or serial number) in the hash string matches any of the identifiers registered by the receiver and/or sender (e.g., depending on the embodiment) recipient. If a match is not found (or a threshold number of criteria discussed above are not found), the hash string may be found invalid. Additionally or alternatively, if the receiver inserts the hash string into a database. If the string is already in the database (indicating that an attempt is being made to re-use the hash string), it is invalid. If the hash string passes one or more (or all) of these tests (e.g., depending on the embodiment, it is considered a valid hash string.

The system may use one or more factors when determining an appropriate nonce to noncritical section 302. First, the system may consider the number of likely decryption attempts needed. For example, if the specified number of zeros is small (i.e., target value is large), although the process of finding the nonce will be easy, the number of decryption attempts will increase because the number of hash digests below target will be larger as well. Second, the system may consider the varying the difficulty of decryption based on expected number of participants and the total electricity consumption by the all the receivers for completing the proof of work tasks. For example, if the difficulty of a proof-of-work task is high, the electricity consumed by receivers for completing the tasks would be higher as well as the number of nonce values tried would be higher. By adjusting the difficulty, the time, and consequently, energy, required for completing the tasks may be appropriately adjusted. Third, the system may vary the difficulty based on a time component associated with the message. For example, the time of multicasting the message must be carefully selected so that there is not too little or too much time for completing the proof-of-work tasks. Notably, this approach is particularly effective if a race to completion is required so that only a subset of receivers may participate in an event. Additionally or alternatively, if there is a possibility for collusion (e.g., one receiver finds the AES-256 key and shares it with others), the utility company may protect itself by limiting the total rewards for an event, and, by allocating those rewards only to a random subset of receivers that completed the decryption first, or by dividing the rewards among all those completed the decryption.

FIG. 4 shows a table of results of completing proof of work tasks in FIG. 3. For example, as discussed above, the complexity of a selected tasks may be used to adjust a number of receivers that may act on transmitted messages. For example, table 400 indicates decryption results for encrypted messages used to specify demand response events in terms of four parameters: (a) event start time, (b) event end time, (c) required percentage of decrease (or increase) in energy consumption and (d) incentive per kWh of adjustment. The results related to a message having a non-critical section (e.g., non-critical section 302 (FIG. 3)) of 25 bytes and a critical section (e.g., critical section 304 (FIG. 3)) of 1605 bytes. As shown in Table I, the number of SHA256 hash values that may be found with the specified number of zeros is inversely proportional to the number of leading zeros required. For example, when seven leading zeros were required in the hash, the receiver went through 50 million hash values before finding one that successfully decrypted the message. Thus, the complexity of selected tasks may be used to adjust the number of receivers that may act on transmitted messages.

FIG. 5 shows an illustrative data format for multicast addressing of messages, in accordance with one or more embodiments. For example, data format 500 may comprise message event details (e.g., demand response and/or curtailment event details that may be included in critical and non-critical sections of a message as described in FIG. 4 above). Data format 500 may comprise a multicast addressing system based on a state-based naming and a count specification mechanism. In some embodiments, one or more network devices may interpret the response event details to determine instructions for modulating electricity generation and/or consumption of electrical devices. The system may select the state-based naming event details as criteria for filtering recipients. The system may achieve this using one or more dynamic and/or static states of the devices. For example, these states may refer to governmentally assigned geographic regions (e.g., a postal address, zip codes, etc.), global positioning coordinates, and/or other geographic designations. The system may also list other device characteristics (e.g., age, type, etc.) and/or use characteristics (e.g., residential vs. commercial, essential vs. non-essential devices, time of continuous use, etc.). Additionally or alternatively, the system may define these states based on dynamic factors (e.g., selecting all device currently consuming above a predetermined threshold). The system may additionally list characteristics of the event (e.g., a time period of the event, generation and/or consumption requirements, etc.). The system may likewise use Boolean operators in one or more combinations (e.g., all devices in a predetermined zip code and currently consuming above a threshold). The system may select the count specification to limit the number of respondents.

For example, as shown in data format 500, the system may specify devices in terms of the dynamic and static states of the devices. For instance, as shown in data format 500, the system may select a set of generation units for curtailment. For example, the specifier in data format 500 directs "residential" solar installations in a zip code (e.g., 02139) with generation capacity greater than or equal to 10 kW (e.g., specified in watts) to curtail the generation to 5 kW (e.g., "[action='curtail [maximum 5000][minimum=0]]") between 3 PM and 4 PM on the Jul. 15, 2020 (e.g., [start time='2020-07-15 15:00:00'][end time='2020-07-15 16:00:00']). Further, the high-level specifiers that identify classes of receivers or applications may be specified in a bootstrap section of a message, which is part of the ATSC 3.0 standard. For example, the bootstrap is a comparatively short signal that precedes, in time, a longer transmitted signal that carries some form of data. The receiver may be configured with the necessary static details (e.g., consumer type, zip code, etc.), and the receiver may be able to read/write the other data parameters from/to the relevant equipment such as inverters, weather stations, loads, etc.

Additionally or alternatively, the methods and systems may utilize another mechanism for modulating electricity generation and/or consumption through multicast communications over broadcast mediums. For example, because the messages (e.g., a demand response message and/or DER message) are broadcast, the system may have difficulty determining the number of receivers (e.g., receiver 106 (FIG. 1)) that may receive and/or act on a transmitted message. In some embodiments, the system may include participant identifiers (e.g., a device serial number and/or other unique identifier used to specifically designate a device to which a message applies). For example, the system may include desired participant IDs from the universe of total participants in a message payload (e.g., using the ATSC 3.0 standard). However, this transmission may raise privacy and confidentiality concerns that makes this approach less attractive. Nonetheless, the system may attempt to limit a maximum number of receivers, at the aggregate level, that acts on a message.

In some embodiments, the system may select a mechanism for limiting the maximum number of receivers, at the aggregate level, that acts on a message based on one or more factors. For example, the system may choose a mechanism based on whether the identifiers (e.g., a device may be a "smart" device and/or otherwise be associated with an identifier that may uniquely identify the device) of receivers are known, and whether stricter limits on participation are needed. In some embodiments, the system may also indicate a minimum number of receivers required.

A first mechanism that the system may use is based on identifier-based selection. For example, if receivers (e.g., receiver 208 (FIG. 2) and/or manager 210 (FIG. 2)) have detectable identifiers, the system (e.g., device 202 (FIG. 2)) may select subsets of electrical devices by using expressions (e.g., keyword, Boolean operations, participant IDs) incorporated into the data format (e.g., data format 500 (FIG. 5)) of a message. For instance, all smart meters with an even numbered identifier can be expressed using the following specifier (e.g., based on the use of data format 500 (FIG. 5)):

[equipment="smart–meter"][filter="identifier"]
    [pattern="\d*[02468]$"]]

A second mechanism that the system may use is based on probabilistic selection. For example, if the set of receivers (e.g., receiver 208 (FIG. 2) and/or manager 210 (FIG. 2)) is not known by the system (e.g., device 202 (FIG. 2)) in advance or if the receivers in the set of receivers are not assigned identifiers, the system may specify a probabilistic subset. For instance, to randomly select 25% of smart meters, the following specifier can be used:

[equipment="meter"][type="smart"][filter="random"]
    [selection=0.25]]

Upon receipt, a receiver may generate a random number (in the interval 0 to 1), and, if the generated number is less than a threshold based on the probability (e.g., 0.25), the receiver may be considered to be chosen. The receiver may then automatically (or upon further instruction received from the system) act upon the message. For example, in some embodiments, this mechanism may also require some work from the service requester (e.g., processing time by a computer) as described in FIGS. 3-4. For instance, if twenty-five percent of Electric Vehicles ("EVs") are given a chance to charge their batteries at a discounted rate, an EV owner may act on an offer, even if the generated random number is greater than the specified limit. The requirement of work to be performed by the service requester (e.g., the receiver and/or device associated with the receiver), which introduces an additional burden may prevent this from happening. In some embodiments, the generated number may trigger the burden imposed. For example, a generated number under the threshold (e.g., 0.25) may have a minimum burden, whereas a generated number above the threshold may have a burden that objectively prevents the system from being acted upon.

Figure 6:
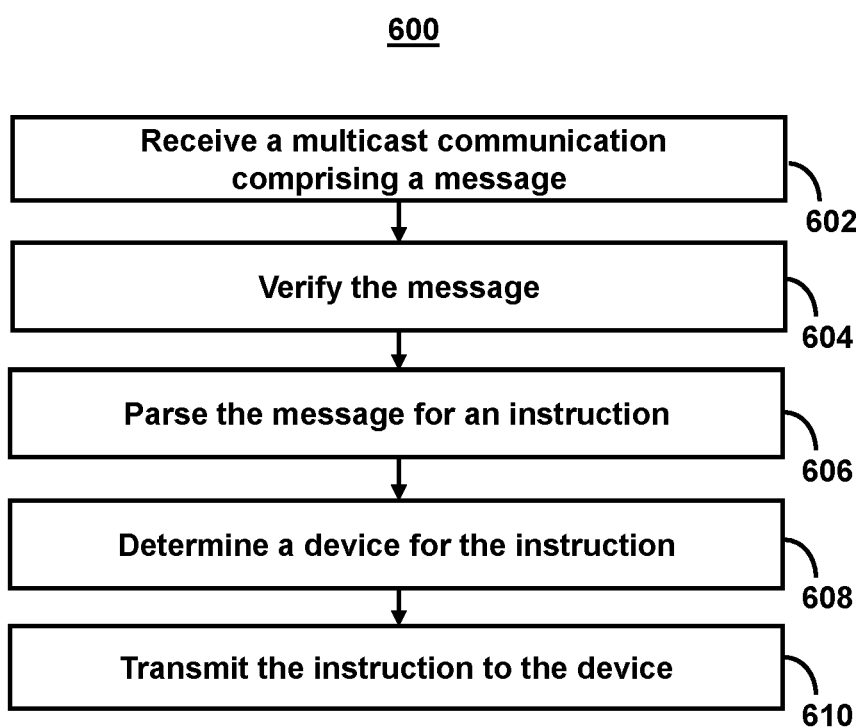
FIG. 6 shows a flowchart of the steps involved in modulating electricity generation and/or consumption through multicast communications, in accordance with one or more embodiments.

FIG. 6 shows a flowchart of the steps involved in modulating electricity generation and/or consumption through multicast communications, in accordance with one or more embodiments. For example, process 600 may represent the steps taken by one or more systems, devices, and/or components as shown in FIGS. 1-5 (e.g., network devices and/or networked electrical devices).

At step 602, process 600 (e.g., using control circuitry of one or more components as shown in FIGS. 1-5)) receives a multicast communication comprising a message (e.g., a demand response message and/or DER message). For example, the system may receive, over a communication network, a multicast communication comprising a message, wherein the message comprising instructions for modulating electricity generation and/or consumption. In some embodiments, the message may be encrypted. For example, the message may be encrypted using a private key and decrypted using a public key. Additionally or alternatively, the communication network may be a broadcast communication network and/or may be based on an ATSC 3.0 or functionally equivalent standard.

At step 604, process 600 (e.g., using control circuitry of one or more components as shown in FIGS. 1-5)) verifies the message. For example, the system may verify that the message is from an authorized source. In some embodiments, verifying that the message is from the authorized source comprises decrypting the message using a public key of the authorized source. For example, the authorized source may be a utility company, and the decrypt the message using a public key provided by the utility company.

At step 606, process 600 (e.g., using control circuitry of one or more components as shown in FIGS. 1-5)) parses the message for an instruction. For example, the system may parse the message for an instruction related to modulating electricity generation and/or consumption in response to verifying that the message is from the authorized source. In some embodiments, parsing the message may comprise and/or trigger several additional steps. For example, in response to parsing the message for an instruction related to modulating electricity generation and/or consumption, the system may compute an appropriate number of electrical devices to achieve a level of adjustment specified in the message. Additionally or alternatively, parsing the message for an instruction related to modulating electricity generation and/or consumption, may require a network device to complete a hash-based computational tasks accessing the instruction.

At step 608, process 600 (e.g., using control circuitry of one or more components as shown in FIGS. 1-5)) determines a device for the instruction. For example, the system may determine an electrical device of a plurality of electrical devices to which to transmit the instruction. In some embodiments, determining a device for the instruction may comprise and/or trigger several additional steps. For example, the system may determine the electrical device of the plurality of electrical devices to which to transmit the instruction comprises interpreting a message event detail received in the message. In some embodiments, the message event detail may comprise an event end time detail, an event start time detail, an event adjustment requirement, or an event adjustment incentive.

Additionally or alternative, the message event detail may comprise a number of devices that may act on the instruction. In such cases, acting on the instruction may comprise randomly generating a number, comparing the number to a threshold number, and acting on the instruction in response to the number corresponding to the threshold number. Additionally or alternative, the message event detail may comprise a specification of electrical device identifiers that may act on the instruction. In such cases, acting on the instruction may comprise retrieving a device identifier for the electrical device, comparing the specification of electrical device identifiers to the device identifier, and acting on the instruction in response to the specification of electrical device identifiers to the device identifier.

At step 610, process 600 (e.g., using control circuitry of one or more components as shown in FIGS. 1-5)) transmits the instruction to the device. For example, the system may transmit the instruction to the electrical device, wherein the instruction causes the electrical device to modulate its electricity generation and/or consumption.

In some embodiments, the instruction may be transmitted via an application programming interface ("API") request. In some embodiments, an API layer may be implemented on the electrical device. Alternatively or additionally, API layer may reside on one or more of cloud components and/or network devices. The API layer (which may be a REST or Web services API layer) may provide a decoupled interface to data and/or functionality of one or more applications. The API layer may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

It is contemplated that the steps or descriptions of FIG. 6 may be used with any other embodiment of this disclosure. In addition, the steps and descriptions described in relation to FIG. 6 may be done in alternative orders, or in parallel to further the purposes of this disclosure. For example, each of these steps may be performed in any order, or in parallel or substantially simultaneously to reduce lag or increase the speed of the system or method. Furthermore, it should be noted that any of the devices or equipment discussed in relation to FIGS. 1-4 could be used to perform one of more of the steps in FIG. 6.

Figure 7:
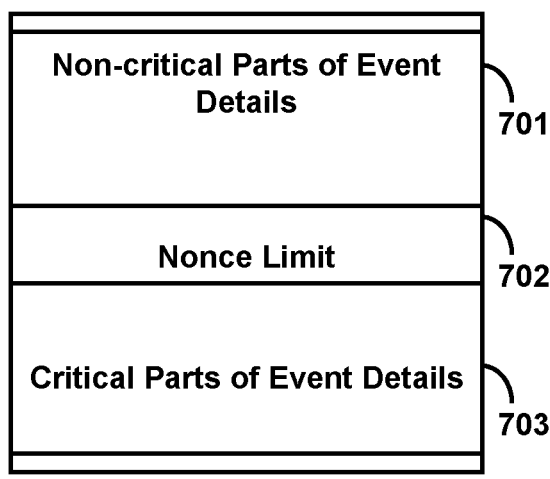
FIG. 7 shows the structure of an illustrative message for modulating electricity generation and/or consumption, in accordance with one or more embodiments.

FIG. 7 shows the structure of an illustrative message 700 for modulating electricity generation and/or consumption, in accordance with one or more embodiments. While details of message 700 are provided below, message 700 may additionally or alternatively contain any combination of features previously disclosed with regard to message 300, described with reference to FIG. 3. In some embodiments, message 700 may contain various sections for use in implementing the message for controlling electricity modulation and also for facilitating encryption/decryption to do so securely. In the embodiment illustrated in FIG. 7, message 700 may include non-critical section 701 (similar to non-critical section 302) that may contain plain-text information such as name of the utility, hash algorithm used, encryption algorithm used, date, time-of-day, and in some embodiments, a set of random characters. This section may be used as described below to create a hash value (e.g. via hash function SHA-256, SHA-512, etc.) that may be used as a key to encrypt the critical section of the message.

Message 700 may also include a nonce limit 702, which may be data that contains the minimum number of zeros that must be in the generated hash value. In certain implementations, this nonce limit may be included as part of non-critical section 701 or may be a separate section of the message.

Message 700 may also contain critical section 703 (similar to critical section 304). In some embodiments, decryption of critical section 703 section may not be allowed, or access otherwise denied, until proof-of-work (e.g., finding the hash value) is completed and verified.

Figure 8:
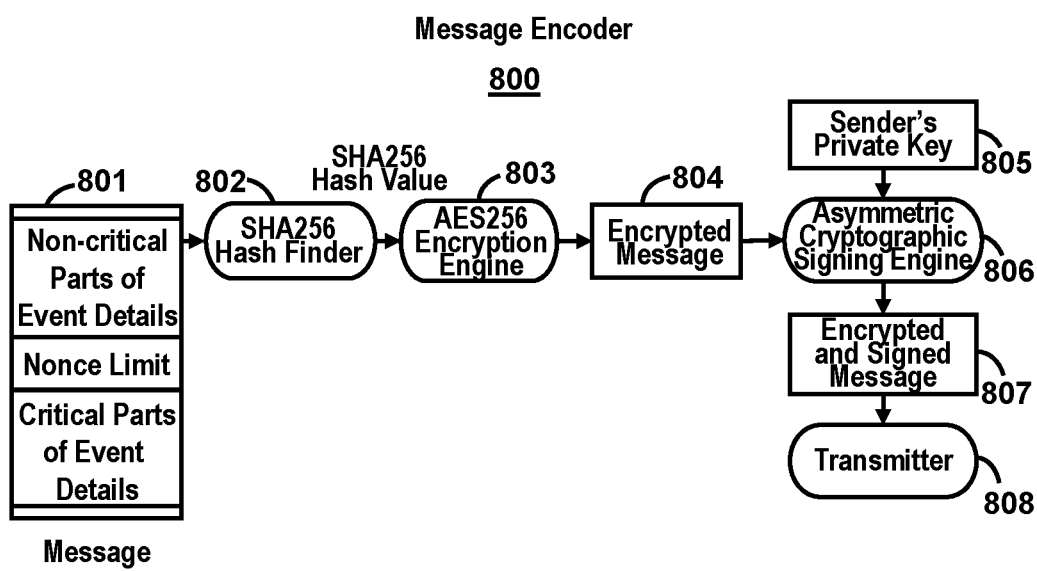
FIG. 8 shows a flowchart for encrypting and transmitting a message, in accordance with one or more embodiments.

FIG. 8 shows a flowchart for encrypting and transmitting a message, in accordance with one or more embodiments. In the flowchart of FIG. 8 (and FIG. 9), certain computer operations, engines, or physical components may be realized by one or more software modules that may reside in to be implemented on a number of computing systems utilizing any number of data processors. In the flowcharts, such elements are generally depicted as ovals whereas data objects are depicted with rectangles.

In the embodiment of FIG. 8, a system herein referred to as message encoder 800 for encoding/encrypting a message may begin with message 801 (e.g., message 300 or message 700) being sent to hash finder 802, which may be a software module as described above. Hash finder 802 may generate hashes that satisfy the minimum nonce limit specified in the message. For instance, if the nonce limit is 3, some (or all) hashes with three or more zeros will be considered. In certain embodiments, hash finder 802 may be configured such that when a valid hash is not found, the hash finder process will adjust the nonce limit (e.g., decreasing) until one or more valid hashes are found. One of those valid hashes may be selected to be the key for encrypting the message. The selection may be the first valid hash, a random selection from the valid hashes, etc.

Encryption engine 803 (utilizing, e.g., AES 32, 128, or 256 encryption) may receive the hash selected by hash finder 802 (e.g., utilizing hash functions SHA-256, SHA-512, etc.). Encryption engine 803 may take the selected valid hash and encrypt at least the critical section of message 801. In some embodiments, the nonce limit and non-critical sections of the message are left unencrypted. Encryption engine 803 may then output encrypted message 804.

To tie the encrypted message to a particular user or entity, a public-private key scheme may be implemented by message encoder 800 to ultimately generate a digitally signed and encrypted message. A private key 805 may be generated or received by the sender (e.g. utility company). Such private keys may be used by an asymmetric cryptographic algorithm such as RSA, DSS, ElGamal, Diffie-Hellman key exchange, etc.

Asymmetric cryptographic signing engine 806 may receive encrypted message 804 and private key 805 of the sender and sign encrypted message 804 using private key 805. The digital signature may be verified via the use of a public key (described further with reference to FIG. 9). The public key allows verification that message is associated with the source of the private key, e.g., the message allowing modulation electricity consumption in fact originated from the utility company rather than an unauthorized actor. Asymmetric cryptographic signing engine 806 may then output encrypted and signed message 807, e.g., the message that was encrypted by the encryption engine 803 and signed by signature engine 806.

Transmitter 808 may receive encrypted and signed message 807 from asymmetric cryptographic signing engine 806. The transmitter 808 may also be configured to broadcast encrypted and signed message 807. As described herein, transmitter 808 may include embodiments configured to broadcast according to standards such as ATSC 3.0, 2.0, or 1.0. Some embodiments of transmitter 808 may also contain features as described with regard to broadcast station 104.

Figure 9:
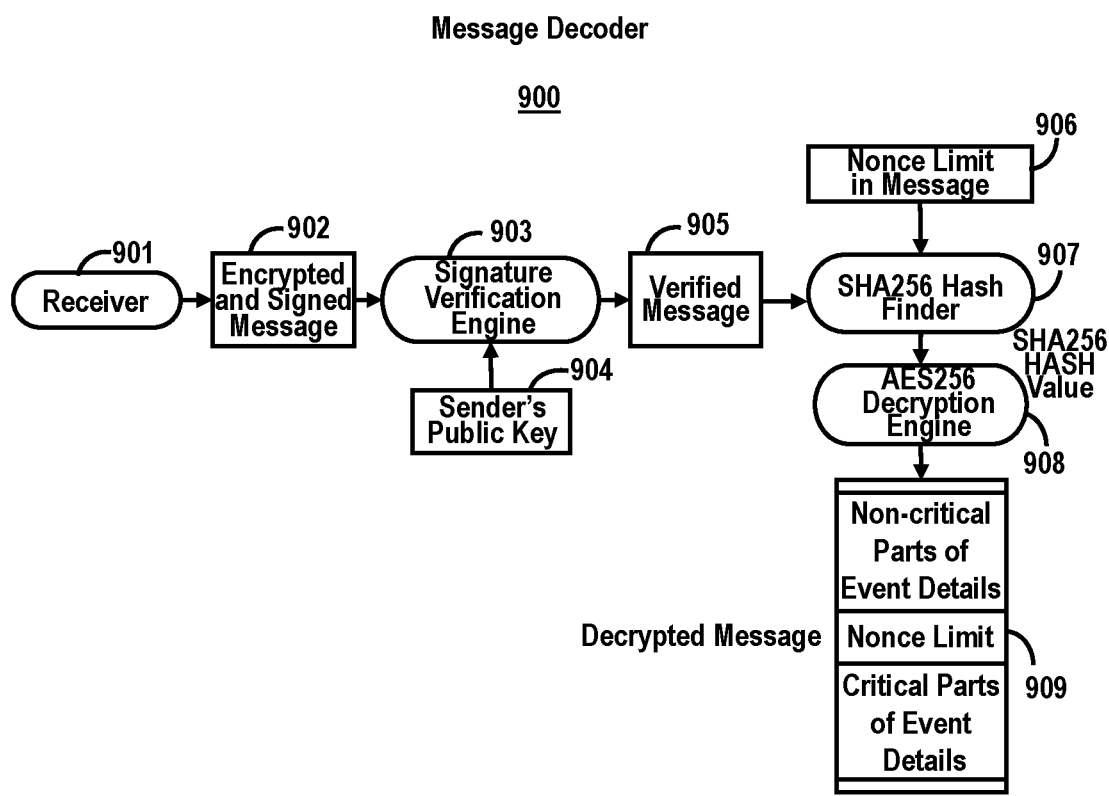
FIG. 9 shows a flowchart for receiving and decrypting a message, in accordance with one or more embodiments.

FIG. 9 shows a flowchart for receiving and decrypting a message, in accordance with one or more embodiments. To ensure that received messages purporting to modulate the operation of electrical sources are from an authorized sender (e.g., the utility company), certain implementations disclosed herein may include a system configured to decrypt such messages utilizing public/private key encryption protocols as discussed above.

In one embodiment, message decoder 900, a system analogous to message encoder 800, may include a receiver 901. Receiver 901 may be configured to receive messages (e.g., encrypted and signed message 807) as broadcast by transmitter 808. Some embodiments of receiver 901 may be configured to receive messages broadcast according to the exemplary standards described above (e.g., ATSC 3.0, 2.0, or 1.0). Receiver 901 may then output encrypted and signed message 902 (e.g., the message generated by 807). Some embodiments of receiver 901 may also contain features as described with regard to ATSC receiver 106.

Certain embodiments may include signature verification engine 903, which may be configured to receive and utilize public key 904 of the sender to verify the message was signed with the private key 805 of the sender. The message decoder 900 may be configured to download public key 904 over the Internet, receive it via a physical connection such as a USB drive or port, or over another wired or wireless connection. The signature verification engine 903 may verify that the message is authentic (e.g., by confirming that the message was signed with the sender's private key 805 that is the complement of the sender's public key 904). Once verified, the signature verification engine 903 may generate and output verified message 905 for further processing.

Hash finder 907 may be utilized to determine the hash needed to decrypt the message. In one embodiment, hash finder 907 may obtain nonce limit 906 from any of the messages described herein that contain a nonce limit. For example, nonce limit 906 may be the nonce limit from message 300, nonce limit 702 from message 700, nonce limit from message 807, etc. Hash finder 907 may be configured to determine one or more hashes that satisfy the minimum nonce limit specified in the message. In some embodiments hash finder 907 may be substantially identical in operation to hash finder 802.

Decryption engine 908 may be configured to decrypt the message using the hash values generated by hash finder process 907. Decryption engine 908 may attempt to decrypt the message based on hashes received from hash finder 907. Valid hashes generated by hash finder 907 may be tried in any order, e.g., sequentially, randomly, etc. to find a key for decrypting the message. This process may continue until a key that decrypts the message is found. Once a key is found, decryption engine 908 may output decrypted message 909, which may then be substantially identical to the original message 801 broadcast by transmitter 808. Decrypted message 909 may then be utilized as described herein to perform modulation of electricity generation and/or consumption. In some embodiments, decryption engine 908 may be configured to decrypt messages that were encrypted by, e.g., AES 32, 128, or 256 encryption.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for modulating electricity generation and/or consumption through multicast communications over broadcast mediums.
2. A method for modulating electricity generation and/or consumption through multicast communications over broadcast mediums, the method comprising transmitting a message as a multicast communication over a communication network based on an ATSC 3.0 or functionally equivalent standard, wherein the message comprises a data format that causes an electrical component to modulate its electricity generation and/or consumption.
3. A method for modulating electricity generation and/or consumption through multicast communications over broadcast mediums, comprising: receiving, over a communication network, a multicast communication comprising a message, wherein the message comprises instructions for modulating electricity generation and/or consumption; verifying that the message is from an authorized source; in response to verifying that the message is from the authorized source, parsing the message for an instruction related to modulating electricity generation and/or consumption; determining an electrical device of a plurality of electrical devices to which to transmit the instruction; and transmit the instruction to the electrical device, wherein the instruction causes the electrical device to modulate its electricity generation and/or consumption.
4. The method of any of the preceding embodiments, wherein verifying that the message is from the authorized source comprised by decrypting the message using a public key of the authorized source.
5. The method of any of the preceding embodiments, further comprising in response to parsing the message for an instruction related to modulating electricity generation and/or consumption, computing an appropriate number of electrical devices to achieve a level of adjustment specified in the message.
6. The method of any of the preceding embodiments, wherein determining the electrical device of the plurality of electrical devices to which to transmit the instruction comprises interpreting a message event detail received in the message.
7. The method of any of the preceding embodiments, wherein the message event detail comprises an event end time detail, an event start time detail, an event adjustment requirement, or an event adjustment incentive.
8. The method of any of the preceding embodiments, wherein the message event detail comprises a number of devices that may act on the instruction.
9. The method of any of the preceding embodiments, wherein acting on the instruction comprises: randomly generating a number; comparing the number to a threshold number; and acting on the instruction in response to the number corresponding to the threshold number.
10. The method of any of the preceding embodiments, in which the message event detail comprises a specification of electrical device identifiers that may act on the instruction, and wherein acting on the instruction comprises: retrieving a device identifier for the electrical device; comparing the specification of electrical device identifiers to the device identifier; and acting on the instruction in response to the specification of electrical device identifiers to the device identifier.
11. The method of any of the preceding embodiments, wherein the message is encrypted using a private key, and decrypted using a public key.
12. The method of any of the preceding embodiments, wherein parsing the message for an instruction related to modulating electricity generation and/or consumption requires the network device to complete a hash-based computational task based on a proof-of-work scheme for accessing the instruction.
13. A tangible, non-transitory, machine-readable medium storing instructions that, when executed by a data processing apparatus, cause the data processing apparatus to perform operations comprising those of any of embodiments 1-12.
14. A system comprising: one or more processors; and memory storing instructions that, when executed by the processors, cause the processors to effectuate operations comprising those of any of embodiments 1-12.
15. A system comprising means for performing any of embodiments 1-12.
16. A system comprising cloud-based circuitry for performing any of embodiments 1-12.

What is claimed is:

1. A network device for modulating electricity generation and/or consumption through multicast communications over broadcast mediums, comprising:
   memory configured to store a public key of a utility company; and
   control circuitry configured to:
      receive, at the network device, over a broadcast communication network, a multicast communication comprising an encrypted message, wherein the message comprises instructions for modulating electricity generation and/or consumption;

verify, at the network device, that the message is from the utility company by decrypting the message using the public key;

in response to verifying that the message is from the utility company, parse, at the network device, the message for an instruction related to modulating electricity generation and/or consumption, wherein parsing the message for an instruction related to modulating electricity generation and/or consumption requires the network device to complete a hash-based computational task based on a proof-of-work scheme for accessing the instruction;

determine, at the network device, an electrical device of a plurality of electrical devices to which to transmit the instruction; and transmit, by the network device, the instruction to the electrical device, wherein the instruction causes the electrical device to modulate its electricity generation and/or consumption.

2. A method for modulating electricity generation and/or consumption through multicast communications over broadcast mediums, comprising:

receiving, at a network device, over a communication network, a multicast communication comprising a message, wherein the message comprises instructions for modulating electricity generation and/or consumption;

verifying, at the network device, that the message is from an authorized source;

in response to verifying that the message is from the authorized source, parse, at the network device, the message for an instruction related to modulating electricity generation and/or consumption, wherein parsing the message for an instruction related to modulating electricity generation and/or consumption requires the network device to complete a hash-based computational task based on a proof-of-work scheme for accessing the instruction;

determining, at the network device, an electrical device of a plurality of electrical devices to which to transmit the instruction; and transmit, by the network device, the instruction to the electrical device, wherein the instruction causes the electrical device to modulate its electricity generation and/or consumption.

3. The method of claim 2, wherein verifying that the message is from the authorized source comprises decrypting the message using a public key of the authorized source.

4. The method of claim 2, further comprising, in response to parsing the message for an instruction related to modulating electricity generation and/or consumption, computing an appropriate number of electrical devices to achieve a level of adjustment specified in the message.

5. The method of claim 2, wherein determining the electrical device of the plurality of electrical devices to which to transmit the instruction comprises interpreting a message event detail received in the message.

6. The method of claim 5, wherein the message event detail comprises an event end time detail, an event start time detail, an event adjustment requirement, or an event adjustment incentive.

7. The method of claim 5, wherein the message event detail comprises a number of devices that may act on the instruction.

8. The method of claim 7, wherein acting on the instruction comprises:

randomly generating a number;
comparing the number to a threshold number; and
acting on the instruction in response to the number corresponding to the threshold number.

9. The method of claim 5, the message event detail comprises a specification of electrical device identifiers that may act on the instruction, and wherein acting on the instruction comprises:

retrieving a device identifier for the electrical device;
comparing the specification of electrical device identifiers to the device identifier; and
acting on the instruction in response to the specification of electrical device identifiers to the device identifier.

10. The method of claim 2, wherein the message is encrypted using a private key and decrypted using a public key.

11. A non-transitory, computer-readable medium for modulating electricity generation and/or consumption through multicast communications over broadcast mediums, comprising instructions that, when executed by one or more processors, cause operations comprising:

receiving, at a network device, over a communication network, a multicast communication comprising a message, wherein the message comprises instructions for modulating electricity generation and/or consumption;

verifying, at the network device, that the message is from an authorized source;

in response to verifying that the message is from the authorized source, parsing, at the network device, the message for an instruction related to modulating electricity generation and/or consumption, wherein parsing the message for an instruction related to modulating electricity generation and/or consumption requires the network device to complete a hash-based computational task based on a proof-of-work scheme for accessing the instruction;

determining, at the network device, an electrical device of a plurality of electrical devices to which to transmit the instruction; and transmit, by the network device, the instruction to the electrical device, wherein the instruction causes the electrical device to modulate its electricity generation and/or consumption.

12. The non-transitory, computer-readable medium of claim 11, wherein verifying, at the network device, that the message is from the authorized source comprises by decrypting the message using a public key of the authorized source.

13. The non-transitory, computer-readable medium of claim 11, wherein the instructions further cause operations comprising computing an appropriate number of electrical devices to achieve a level of adjustment specified in the message in response to parsing the message for an instruction related to modulating electricity generation and/or consumption.

14. The non-transitory, computer-readable medium of claim 11, wherein determining the electrical device of the plurality of electrical devices to which to transmit the instruction comprises interpreting a message event detail received in the message.

15. The non-transitory, computer-readable medium of claim 14, wherein the message event detail comprises an event end time detail, an event start time detail, an event adjustment requirement, or an event adjustment incentive.

16. The non-transitory, computer-readable medium of claim 14, wherein the message event detail comprises a number of devices that may act on the instruction.

17. The non-transitory, computer-readable medium of claim 16, wherein acting on the instruction comprises:
   randomly generating a number;
   comparing the number to a threshold number; and
   acting on the instruction in response to the number corresponding to the threshold number.

18. The non-transitory, computer-readable medium of claim 14, the message event detail comprises a specification of electrical device identifiers that may act on the instruction, and wherein acting on the instruction comprises:
   retrieving a device identifier for the electrical device;
   comparing the specification of electrical device identifiers to the device identifier; and
   acting on the instruction in response to the specification of electrical device identifiers to the device identifier.

\* \* \* \* \*